United States Patent
Husain (10) Patent No.: US 9,818,060 B2
(45) Date of Patent: Nov. 14, 2017

(54) SYSTEM AND METHOD FOR GENERATION OF A HEURISTIC

(71) Applicant: SparkCognition, Inc., Austin, TX (US)

(72) Inventor: Syed Mohammad Amir Husain, Round Rock, TX (US)

(73) Assignee: SparkCognition, Inc., Austin, TX (US)

( * ) Notice: Subject to any disclaimer, the term of this patent is extended or adjusted under 35 U.S.C. 154(b) by 0 days.

(21) Appl. No.: 15/354,122

(22) Filed: Nov. 17, 2016

(65) Prior Publication Data

US 2017/0068892 A1   Mar. 9, 2017

Related U.S. Application Data

(63) Continuation of application No. 14/174,382, filed on Feb. 6, 2014, now abandoned.

(51) Int. Cl.
| | |
|---|---|
| *G06F 17/00* | (2006.01) |
| *G06N 5/00* | (2006.01) |
| *G06N 5/02* | (2006.01) |
| *G06N 5/04* | (2006.01) |

(52) U.S. Cl.
CPC .............. *G06N 5/003* (2013.01); *G06N 5/025* (2013.01); *G06N 5/047* (2013.01)

(58) Field of Classification Search
CPC ..... G06F 21/56; G06F 21/564; G06N 3/0436; G06K 9/46
USPC .............................................. 706/12, 45, 62
See application file for complete search history.

(56) References Cited

U.S. PATENT DOCUMENTS

| | | | | |
|---|---|---|---|---|
| 5,452,442 | A | * 9/1995 | Kephart | G06F 21/564 713/188 |
| 6,088,658 | A | * 7/2000 | Yazici | G01R 31/1227 702/180 |
| 7,813,822 | B1 | 10/2010 | Hoffberg | |
| 8,316,237 | B1 | 11/2012 | Felsher et al. | |
| 2009/0287837 | A1 | 11/2009 | Felsher | |
| 2010/0235285 | A1 | 9/2010 | Hoffberg | |
| 2010/0317420 | A1 | 12/2010 | Hoffberg | |
| 2013/0111591 | A1* | 5/2013 | Topan | G06F 21/563 726/24 |
| 2013/0159021 | A1 | 6/2013 | Felsher | |
| 2013/0326625 | A1* | 12/2013 | Anderson | G06F 21/56 726/23 |

(Continued)

OTHER PUBLICATIONS

Non-Final Office Action in U.S. Appl. No. 14/174,382 dated Mar. 1, 2016.

(Continued)

*Primary Examiner* — David Vincent
(74) *Attorney, Agent, or Firm* — Greenberg Traurig, LLP; Chinh H. Pham; Robert L. Hover (57) ABSTRACT

A system and method for generating a heuristic is provided. A heuristic is capable of identifying data patterns. The method includes: extracting a data set from multiple input sources; creating a set of unique elements used across the data set; organizing the data set into a geometric structure; grouping portions of the data in the geometric structure into a plurality sub geometric structures; determining base attributes for each sub geometric structure using the set of unique elements; identifying trends in the base attributes among the sub geometric structures; and outputting the heuristic as a combination of the base attributes and the trends.

21 Claims, 4 Drawing Sheets

(56) References Cited

U.S. PATENT DOCUMENTS

2014/0165203 A1* 6/2014 Friedrichs ............... G06F 21/56
                                                              726/24
2015/0096023 A1* 4/2015 Mesdaq ................ H04L 63/145
                                                              726/23

OTHER PUBLICATIONS

Final Office Action in U.S. Appl. No. 14/174,382 dated Jun. 17, 2016.

* cited by examiner

| this | text | string | will |
|---|---|---|---|
| be | used | as | an |
| example | of | organizing | input |
| into | a | geometric | structure |

FIG. 4

| this | text | string | will |
|---|---|---|---|
| be | used | as | an |
| example | of | organizing | input |
| into | a | geometric | structure |

FIG. 5

SYSTEM AND METHOD FOR GENERATION OF A HEURISTIC

CROSS-REFERENCE TO RELATED APPLICATIONS

This application is a continuation patent Application of U.S. application Ser. No. 14/174,382, filed on Feb. 6, 2014. The contents of the application are incorporated herein by reference in its entirety.

BACKGROUND OF THE INVENTION

Field of the Invention

The present invention relates to a system and method for generating a heuristic that is capable of identifying data patterns. More particularly, the present invention relates to a system and method for automatically creating a heuristic to be used in conjunction with a cognitive fingerprinting system and method.

Description of the Related Art

In the security field, most anti-virus (AV) products rely on pre-computed signatures to identify viruses and threats. However, there is not always enough time for a threat to be found and analyzed, a signature engineered, and an update delivered to users before they are targeted.

Similarly, methods are needed to prevent data theft by unauthorized users. For example, if login credentials for an individual user fall into unauthorized hands, the party possessing these credentials may be able to log into a system or network for which these credentials provide access, and over time, remove proprietary or confidential information from a secure environment. Thus, there exists a need to detect the scenario where legitimate login credentials are being utilized by unauthorized persons, particularly when the theft of data is "subtle" and occurs over a period of time. Multi-factor authentication schemes such as retina and fingerprint scans address the issue of validating identity, however they can be defeated or circumvented when an authorized user indulges in unauthorized removal or theft of information. Additionally, it can be cost-prohibitive to put such defenses in a typical business network at all entry points, such as desktop computers, mobile endpoints and Thin clients.

Methods are needed to detect when legitimate users with authorized credentials are still engaging in unauthorized behavior. Recently, there have been a number of high-profile incidents where an authorized user engages in behavior beyond the scope of their authorization and subsequently steals and releases confidential information. While access control limitations such as attaching permissions to data exist, these protections do not protect widespread data theft when a user has legitimate access to the data. Thus, there exists a need to detect atypical behavior by a user on a network to prevent such security breaches.

The use of neural network based recognition systems is common within many industries. These systems typically process inputs as sequences of bits which are connected to a number of cells or neurons. These approaches are theoretically content agnostic in that they do not have to account differently for text, images or other forms of input. But in practice, this generality can impose penalties in the form of slower learning processes and the necessity of creating "deep" structures in order to capture enough pattern information that would allow the system to deliver meaningful results and subsequent recognition.

Other learning approaches are highly tuned to the type of content being processed. For example, some Inductive Logic Programming (ILP) methods process higher-level concepts such as "facts" and "truths" and encode their implications to create reasoning chains. These approaches typically require developing evaluators for context-specific attributes. In many instances, approaches like ILP lack flexibility because they require a lot of domain specific information, customization and may not scale to handle variations of problems from adjacent domains.

SUMMARY OF THE INVENTION

Aspects of the present invention address at least the above-mentioned problems and/or disadvantages and provide at least the advantages described below. Accordingly, an aspect of the present invention is to generate a heuristic that is capable of identifying data patterns. Another aspect of the present invention is to provide a heuristic to be used in conjunction with a cognitive fingerprinting method. A core cognitive fingerprint is used to identify and respond to a predetermined goal state by analyzing system data through the use of pattern recognizers which implement heuristics. Response actions can be executed if a core fingerprint falls within the threshold of a target goal (where a goal can be an event such as whether malware is detected or unauthorized data theft is detected). In contrast to an approach that would capture a single system state, a core cognitive fingerprint can represent the temporal evolution of a system over time.

In accordance with another aspect of the present invention, a method for generating a heuristic is provided. The method includes: extracting a data set from multiple input sources; creating a set of unique elements used across the data set; organizing the data set into a geometric structure; grouping portions of the data in the geometric structure into a plurality of sub geometric structures; determining base attributes for each sub geometric structure using the set of unique elements; identifying trends in the base attributes among the sub geometric structures; and outputting the heuristic as a combination of the base attributes and the trends. In accordance with another aspect of the present invention, a computer system for creating a heuristic is provided.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description is provided to assist in a comprehensive understanding of exemplary embodiments of the invention as defined by the claims and their equivalents. It includes various specific details to assist in that understanding; however these specific details are to be regarded as merely exemplary. Accordingly, those of ordinary skill in the art will recognize that various changes and modifications of the embodiments described herein can be made without departing from the scope and spirit of the invention.

Figure 1:
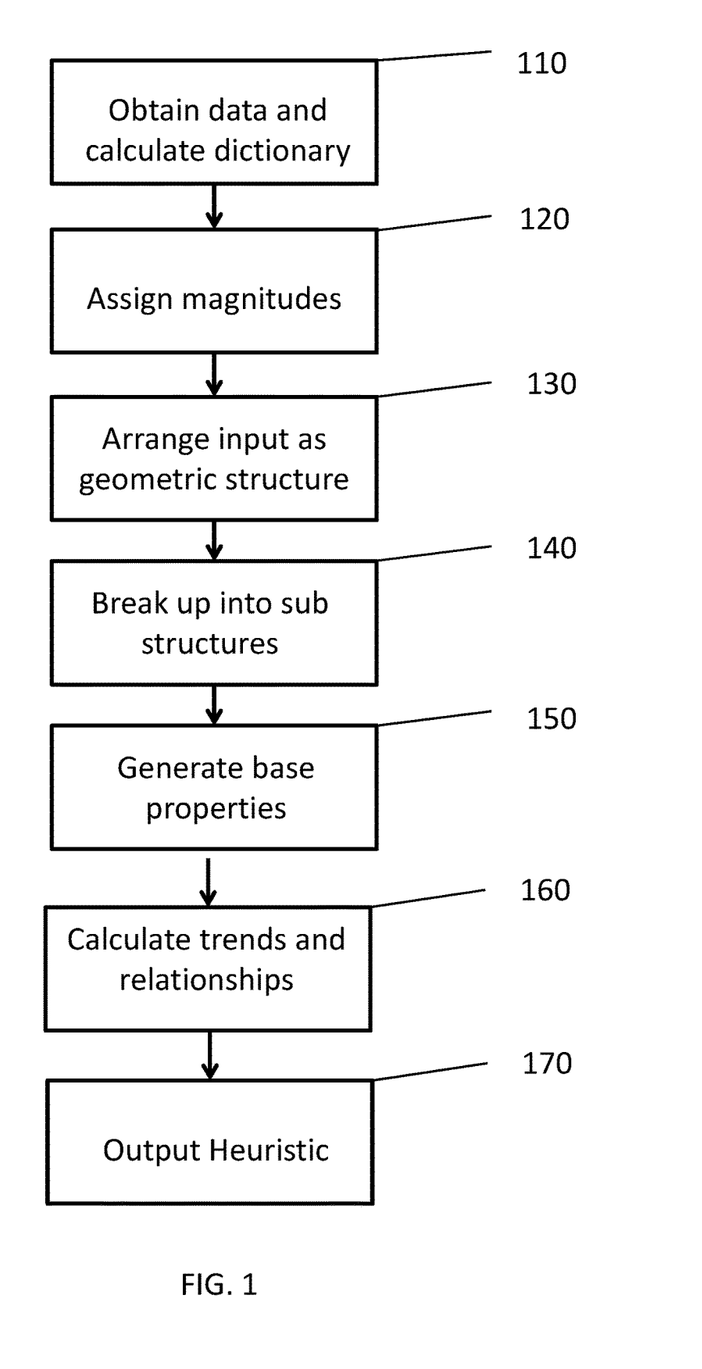
FIG. 1 is a block diagram of a heuristic generation process according to an exemplary embodiment of the present invention.

FIG. 1 is a block diagram of a heuristic generation process according to an exemplary embodiment of the present invention. Referring now to FIG. 1, data from which a heuristic will be generated is obtained at step 110. Data can be obtained from a user computer system, a wireless phone, a network server, and can arrive or be extracted from multiple data sources, implementing multiple formats, etc. The data is assessed for unique elements associated therewith and a dictionary is then created from the set of unique elements across the input data. In one embodiment, if the input data is binary then the dictionary can be all unique bytes across the binary data. In another embodiment, if the input data is text then the dictionary can be all unique words across the text. In yet another embodiment, if the input data is images then the dictionary can be the unique colors used across the set of images. These are only examples of the types of data that can form a dictionary and any type of data can be used to form a unique set of elements across the data.

Once each element in the dictionary has been compiled, magnitude values are assigned to each element in the dictionary in step 120. A magnitude value represents a consistent measure of "strength" for a particular element across the dictionary. For example, if the dictionary is all unique words used in a set of text, then the magnitude of each word in the dictionary can be the frequency of occurrence of that word across the set of text. In another example, if the dictionary is a set of unique bytes then the magnitude value of each element in the dictionary can be the value of the byte (i.e. a number between 0 and 255). In yet another example, if the dictionary is a set of colors then the magnitude value of each element in the dictionary can be the RGB number of the color. These are only examples of the types of magnitudes that can be defined and any function that estimates a measure of strength for a particular element can be used. The magnitude value can also be normalized across the input data by setting the magnitude of the entire dictionary to be 1.

In step 130, every element in the input data is organized into a geometric structure along with its corresponding magnitude so that subsequent geometric operations can be performed on the data. In one embodiment, the geometric structure is a two dimensional grid. The geometric structure is configured to allow the structure to be as symmetric as possible. Thus, if the geometric structure is a two dimensional grid then the input data is organized such that the grid most closely resembles a square. In one embodiment, the elements are entered into the grid left to right, row to row until the grid is filled up.

Figure 4:
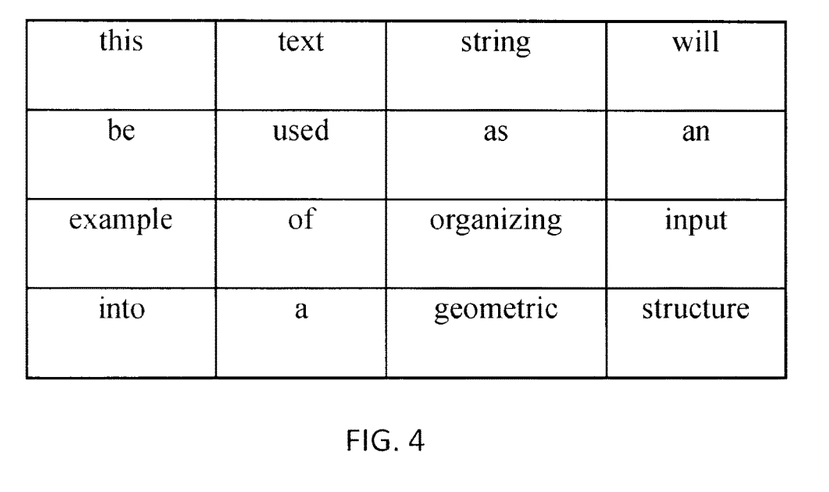
FIG. 4 is an illustration of data organized into a geometric structure according to an exemplary embodiment of the present invention.

For example, if our input data is the string "this text string will be used as an example of organizing input into a geometric structure," then the data can be organized into a two dimensional grid as shown in FIG. 4.

Figure 5:
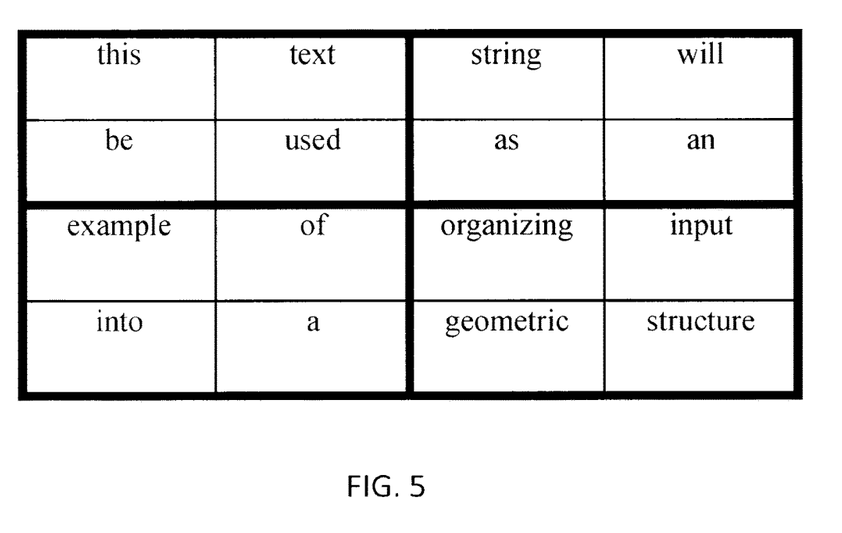
FIG. 5 is an illustration of the geometric structure of FIG. 4 broken up into sub structures.

In step 140, the geometric structure is broken up into sub structures. This allows for the method to subsequently analyze for base properties of information separately for the data in each sub structure. For example, if we have the 4×4 grid provided in FIG. 4 we can break up it into four 2×2 sub-grids as shown in FIG. 5.

Sub structures can take any shape and form, for example they can be as small as a 1×1 cell containing only one word.

After the data in the geometric structure is broken up into sub structures, in step 150 base properties are generated for each sub structure corresponding to presence, magnitude, and position values. The presence base property is the strength of unique elements in the sub structure. For example, if a sub structure contains 10 of 100 unique dictionary elements then the presence value would be 0.1. The magnitude base element is the sum of the magnitudes of the elements in the sub structure. The position base element is the percentage of the most significant element in the sub structure. The most significant element can be defined the most frequent word or another measurement can be used.

Once base properties are calculated for the data in the sub structures, trends are calculated across the sub structures in step 160. A library of different functions can be applied to each row, column, diagonal, or other division of sub structures in the geometric figure. In one embodiment, a linear progression function is used to find a coefficient value a and a constant value c across each row, column, etc. Similarly, other functions may define patterns for other columns and rows.

After we have generated base properties and calculated trends, in step 170 the heuristic is outputted. A heuristic definition may include, in part, references to the sub geometric structures. The heuristic contains all base properties of information for each sub structure previously generated, as well as all of the trends calculated. All values associated with all properties identified previously are coefficients for each corresponding property. For example, a heuristic could contain:

| SAMPLE HEURISTIC | |
|---|---|
| Properties of tests | Values/coefficients |
| gridsize 4 | 4 |
| presence grid 1 | 45% |
| presence grid 2 | 23% |
| presence grid 3 | 32% |
| presence grid 4 | 59% |
| magnitude grid 1 | 121 |
| magnitude grid 2 | 110 |
| ... | ... |
| Fit row1 | a = 4 c = 6 lib func = #101 |
| Fit row2 | a = 5 c = 7 lib func = #1021 |

From such a heuristic it is possible to draw conclusions from input data such as when a painting is made by Monet, the pallete tends to be very gentile (i.e. the strength of presence in low-mid range). Another example conclusion might be that when a stock is a great buy, its price history tends to follow library function 538 in the first sub structure, 629 in the second sub structure, and 631 in the third substructure. Other embodiments may provide indicators for detecting data security threats, such as the presence of malware, hacking attempts, unauthorized behavior by authorized users, and phishing attempts.

Figure 2:
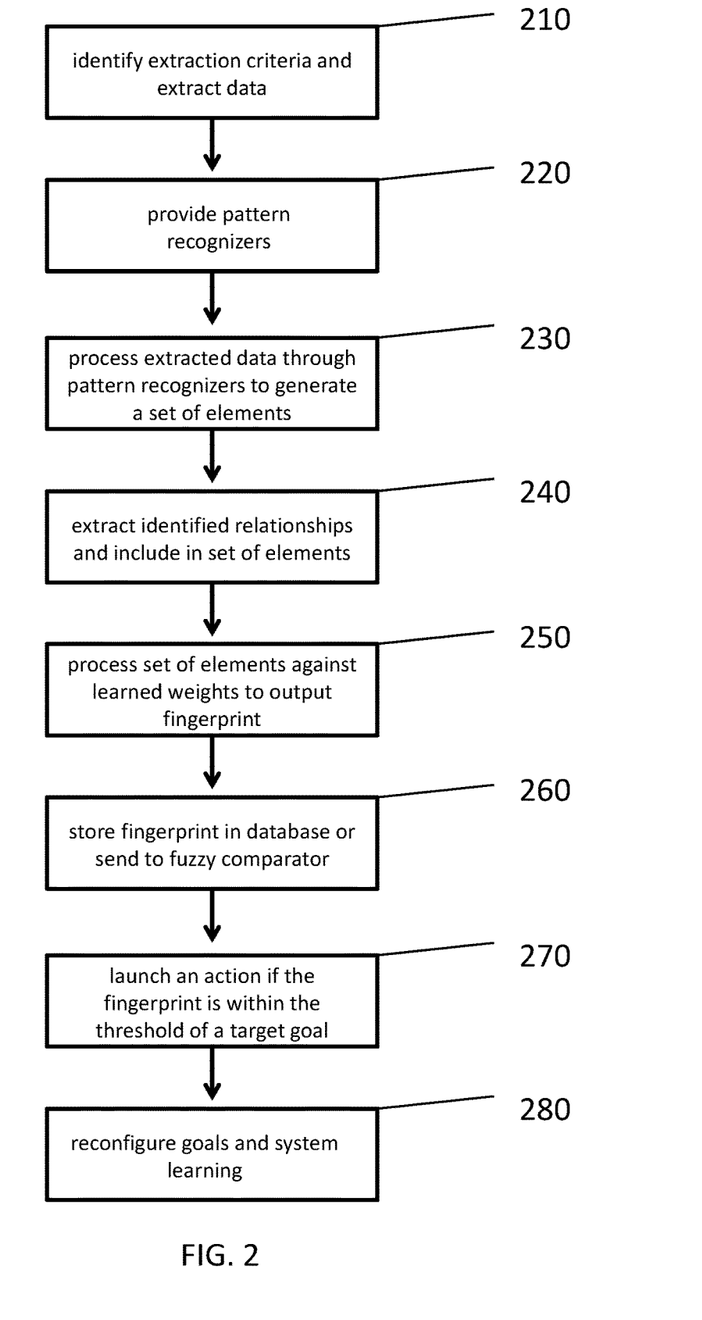
FIG. 2 is a block diagram of a cognitive fingerprinting process according to an exemplary embodiment of the present invention.

FIG. 2 is a more detailed diagram of a cognitive fingerprinting process according to an exemplary embodiment of the present invention.

In step 210, a user can specify extraction criteria such as sources from which data will be extracted. The processor extracts data according to the extraction criteria. Exemplary sources can be system logs, processes, and databases. Data sources can be specified from a user computer system, a wireless phone, a network server, and can include specific files such as CSV files, database tables, polled information from WMI (Windows Management Instrumentation), APIs (Application Programming Interface) or information gathered from Web Services and Web sites. Extraction criteria can also include, for each individual data source, specifying a window of time from which the data will be extracted. For example, a sliding window can be specified to only include data from the previous 4 hours of a system log, whereas a different or similar time frame might be applied to a second data source, e.g. a Twitter feed. Extraction criteria can also including settings for throttling, controlling, and caching the data received from the sources to control the execution speed or resource usage when extracting data.

In step 220, pattern recognizers are provided. The purpose of a pattern recognizer (PR) is to generate a value indicating the strength of the presence of one or more qualities in, or attributes of, the data. In one exemplary embodiment, a pattern recognizer may be implemented via software operating on a computer system. The pattern recognizer may be configured to implement a heuristic function. A heuristic function is able to process a stream input and respond with a strength of match measure. The output of heuristic functions can be normalized in order to compare multiple heuristics. For example, heuristics can be specified to output a real number between 0 and 1. Heuristics can also be specified to content type, for example text, images, signal or video. Specifying the content type of a heuristic allows a pattern recognizer to be content type specific while the overall fingerprinting process remains content agnostic. In one embodiment, the heuristics generated by the process described in FIG. 1 can be used in a pattern recognizer.

In step 230, the extracted data from step 210 is passed through the pattern recognizers to generate a set of elements, the length of the set equivalent to the number of pattern recognizers. Thus, if we have 10 pattern recognizers, a set of 10 elements will be created. The set of elements can be described as a vector. For example, if we have n pattern recognizers (PR) each one can be described (PRi) where i, $\{1 \leq i \leq n\}$ Given an input C, PRi (C)=ai where ai is a vector comprised of n elements.

PR1(C)=a1
PR2(C)=a2
PRn(C)=an and ai, $\{0 \leq ai \leq 1\}$.

Thus, given an input C, PR(C)=A where A is a vector $\{ai\}$ and i, $\{1 \leq i \leq n\}$. A denotes a "set of elements" for input C.

In one embodiment, the method does not limit nor require every pattern recognizer to provide a meaningful output. For example, if a stream comprised of image data is run across a text focused heuristic pattern recognizer, the output may simply be 0. Pattern recognizers may be configured to determine if the provided input is supported by a given pattern recognizer. If a mismatch is identified, a pre-determined system wide output value, such as 0, may be used to indicate this mismatch. Subsequent processing may identify the output as a mismatch and may optionally discard that particular pattern recognizer's output.

In another embodiment, the input sources are already defined as text, image, signal or video and only relevant pattern recognizers will be applied to any input stream while others are turned off.

In step 240 the set of elements generated in step 230 are ran through relationship tests and identified relationships are extracted and added to the set of elements. Relationship test functions take the initial set of elements and extract mathematical relationships existing between the elements, such as equality, correlation, mapping via function, and magnitude comparison. For example:

Inverse (ai,aj) can produce $$\binom{n}{2}$$

identified relationship indications between 0 and 1, for all $(1 \leq i \leq n)$, $(1 \leq j \leq n)$, based on how correlated the deviation of ai and aj is in opposite directions on the number line.

Correlation (ai,aj) can produce $$\binom{n}{2}$$

identified relationship indications between 0 and 1, for all $(1 \leq i \leq n)$, $(1 \leq j \leq n)$, based a statistical relationship involving dependence to indicate the level of correlation between ai and aj.

Min (ai,aj), Max (ai,aj) can produce $$\binom{n}{2}$$

identified relationship indications between 0 and 1, for all $(1 \leq i \leq n)$, $(1 \leq j \leq n)$, based on whether ai is small when aj is large, or vice versa.

Thus, if we have a set of n elements run through k relationship tests each producing $$\binom{n}{2}$$

values, then $$k\binom{n}{2}$$

elements are added to the initial set of elements to yield a new set of elements which now has $$n + k\binom{n}{2}$$

values.

In step 250, the set of elements are applied against learned weights. Learned weights are values which can be adjusted to give certain heuristics more 'power' to influence results than others. In one embodiment, the default values of all of the weights are 1 but can be adjusted later in system learning. The output of this process results in a final set of elements which is the final cognitive fingerprint. For example, if a user of the system determines that two core cognitive fingerprints, which are within a certain threshold, do not actually indicate the same problem (e.g. theft of data), the user may provide such feedback to the system. This feedback, in turn, will cause weights for the pattern recognizers that caused the threshold convergence to be decremented.

In step 260, the final cognitive fingerprint can be stored in a fingerprint database and/or sent to a fuzzy comparator for further action. The fuzzy comparator makes an optimum decision by evaluating each data element in the final cognitive fingerprint. It can be appreciated that the final cognitive fingerprint can be plotted as a vector with a point in space. Fingerprints of various types of content can similarly be plotted in this space. When other similar pieces of content similar are encountered, a fingerprint comparison may yield insights into similarly and mutual relevance.

For each fingerprint calculated for content C1, C2, . . . , Cm, the distance between these fingerprints can be calculated. The square of the distances can be summed and represented as a scalar value. When this distance exceeds a certain threshold there is no match. The match function itself provides a fuzzy notion of matching, i.e. a real number between 0 and 1, rather than a true or false Boolean value.

Two fingerprints can be compared by taking a sum of squared differences between each vector element and determining if the result falls below a threshold value. When the user or app provides system learning regarding the efficacy or usefulness of a fingerprint this feedback is captured. If the fingerprint is not useful, the heuristics which have the highest deltas between them can be strengthened by incrementing their corresponding weight multipliers in vector W. Over time, this minimizes the noise from heuristics that cause a fingerprint to be associated with inaccurate goal states.

In step 270, the fuzzy comparator sends the final cognitive fingerprint to an action engine which launches an action if the fingerprint is within the threshold of a target goal. For example, if the fingerprint matches or approaches an espionage/data theft goal state then an action might trigger a system shut down and email an alert to the system administrator. Similarly, if the system indicates a fingerprint approaching a possible malware goal state then an action could be to quarantine the possible malware and email an alert to the system administrator.

In step 280, a user can reconfigure the goals or system learning. A user can edit, delete, or add goals by entering a goal name 5a, a goal action 5b, a goal description 5c, and criteria 5d that define system states the user is interested in identifying, predicting, and taking action on. Thus, a user can define what a goal is, and what it looks like when it is encountered. Example criteria could be the system crashing or a CPU workload percentage.

Figure 3:
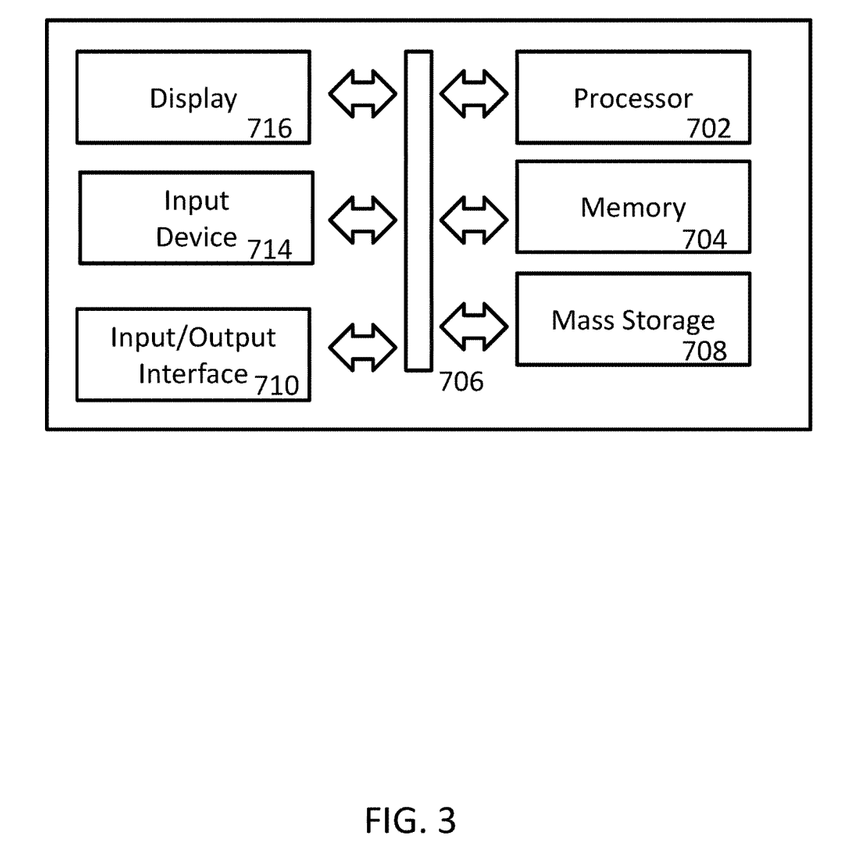
FIG. 3 is an exemplary system according to an exemplary embodiment of the present invention.

FIG. 3 depicts a functional block diagram of computer system. Computer system 702 includes a central processing unit (CPU) 702, a memory 704, an interconnect bus 706, and a display 716. The CPU 702 may include a single microprocessor or a plurality of microprocessors for configuring computer system 702 as a multi-processor system. The memory 704 illustratively includes a main memory and a read only memory. The computer 702 also includes the mass storage device 708 having, for example, various disk drives, tape drives, etc. The main memory 704 also includes dynamic random access memory (DRAM) and high-speed cache memory. In operation and use, the main memory 704 stores at least portions of instructions and data for execution by the CPU 702.

The mass storage 708 may include one or more magnetic disk or tape drives or optical disk drives, for storing data and instructions for use by the CPU 702. At least one component of the mass storage system 708, preferably in the form of a disk drive or tape drive, stores the database used for providing the decision assistance of system of the present invention. The mass storage system 708 may also include one or more drives for various portable media, such as a floppy disk, a compact disc read only memory (CD-ROM), or an integrated circuit non-volatile memory adapter (i.e. PCMCIA adapter) to input and output data and code to and from the computer system.

An exemplary embodiment of a fingerprinting platform workflow is for predicting motor failure. A motor going below 5,000 RPM can be defined as a disaster event which a user might want to predict.

A user can include input sources from the motor such as the motor speed, the motor head level, the motor oil level, and the usage data of the motor which can be streamed in real time.

A user can also include specifying a 4 hour sliding window of time so that only data from the last 4 hours will be extracted. These extraction criteria provide the parameters for the extracted data.

Pattern recognizers are provided which take the extracted data and analyze different patterns found in the data. PR1 outputs an average motor heat over the time period value, PR2 outputs an average oil level over the time period value, PR3 outputs a frequency of use value, and PR4 outputs a volatility of use value.

The processor runs extracted data through the 4 pattern recognizers to and PR1 outputs 0.4 corresponding to its average motor heat heuristic, the PR2 outputs 0.5 corresponding to its average oil level heuristic, PR3 outputs 0.9 corresponding to its frequency of use heuristic, and PR 4 outputs 0.2 corresponding to its volatility of use heuristic. Thus, the set of elements is [0.4, 0.5, 0.9, 0.2].

The set of elements is applied against a set of weights which only 0.5 for the first element and 1 for all of the other values. Thus, the motor heat heuristic is deemphasized. The final fingerprint is the set of elements [0.2, 0.5, 0.9 and 0.2] because only the first element was multiplied by 0.5.

This fingerprint can be sent to a fuzzy comparator. The fuzzy comparator has in its database 20 other 5,000 RPM disaster event fingerprints that have been previously identified, one for each time the event occurred. The fuzzy comparator compares the current fingerprint with the disaster set of fingerprints by calculating a distance in space. The fuzzy comparator might send the fingerprint to an action engine if the distance is within a predetermined threshold of a goal state. The action engine takes corrective action because the fingerprint falls within a threshold of the disaster goal state approximated by the 20 other fingerprints.

A user can reconfigure previous goals by associating or dissociating new fingerprints with the goals or create new goals for further learning. It can be appreciated that in a complex system like a factory floor, many things may lead to the motor speed going below 5,000 RPM. Each of the 20 fingerprints may actually correspond to different reasons for failure. If we create a cluster diagram of those 20, we may find that there are 3 groupings (using a statistical technique known as clustering). This would suggest that while there are 20 failures, there are really 3 reasons why. Thus, different actions can be created for the different groupings.

Other embodiments for the fingerprinting platform can be for detecting malware by creating cognitive fingerprints that identify and predict the presence of malware; detecting hacking by identifying and clustering fingerprints that immediately preceded a hack; and detecting phishing by creating cognitive fingerprints which correlate messages, their contents, links and payloads with what they actually do on the system.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method for monitoring a computing system by cognitive fingerprinting, comprising:
   extracting, by a processor, a data set from a plurality of input sources across a monitored computing system;
   compiling a dictionary of unique elements identified in the data set, each unique element representing a unique discrete portion of the data set corresponding to a portion of the monitored computing system or a status of the portion of the monitored computing system;
   organizing the unique elements of the data set into a two-dimensional geometric structure, portions of the data in the geometric structure further grouped into a plurality of sub geometric structures;
   generating a heuristic describing the two or greater-dimensional geometric structure, the plurality of sub geometric structures, one or more base properties determined for each sub geometric structure, the base properties determined using the dictionary of unique elements, and one or more trends identified in the base properties among the sub geometric structures;
   applying one or more pattern recognizers to the heuristic to produce a set of fingerprint elements corresponding to one or more discrete qualities in or attributes of the data set corresponding to the monitored computing system;
   creating a cognitive fingerprint corresponding to the fingerprint elements;
   comparing, by the processor, the cognitive fingerprint to a previously recorded cognitive fingerprint by taking a sum of squared differences between each element in the final set of elements and each element of the previously recorded cognitive fingerprint to determine a scalar value for comparison to a threshold of a target goal; and
   one or more of shutting down the monitored computing system or quarantining at least a portion of the extracted data in response to the scalar value being within the threshold of the target goal.

2. The method of claim 1, further comprising:
   assigning a magnitude value to each element in the set of unique elements.

3. The computer implemented method of claim 2, wherein one of the base properties determined is a presence attribute.

4. The method of claim 2, wherein one of the base properties determined is a magnitude attribute.

5. The method of claim 2, wherein one of the base properties determined is a position attribute.

6. The method of claim 2, wherein outputs of all base properties are normalized amongst each other.

7. The method of claim 2, wherein the trends are identified by using a linear progression function.

8. The method of claim 2, further comprising:
   generating a heuristic definition including references to the sub geometric structures.

9. A computer monitoring system, comprising:
   a processor; and
   memory coupled to the processor and storing instructions that, when executed by the processor, cause the computer monitoring system to:
      extract a data set from a plurality of input sources across a monitored computer system;
      compile a dictionary of unique elements identified in the data set, each unique element representing a unique discrete portion of the data set corresponding to a portion of the monitored computer system or a status of the portion of the monitored computer system;
      organize the unique elements of the data set into a two-dimensional geometric structure, portions of the data in the geometric structure further grouped into a plurality of sub geometric structures;
      generate a heuristic describing the two or greater-dimensional geometric structure, the plurality of sub geometric structures, one or more base properties determined for each sub geometric structure, the base properties determined using the dictionary of unique elements, and one or more trends identified in the base properties among the sub geometric structures;
      apply one or more pattern recognizers to the heuristic to produce a set of fingerprint elements corresponding to one or more discrete qualities in or attributes of the data set corresponding to the monitored computer system;
      create a cognitive fingerprint corresponding to the fingerprint elements;
      compare the cognitive fingerprint to a previously recorded cognitive fingerprint by taking a sum of squared differences between each element in the final set of elements and each element of the previously recorded cognitive fingerprint to determine a scalar value for comparison to a threshold of a target goal; and
      one or more of shutting down the monitored computer system or quarantining at least a portion of the extracted data in response to the scalar value being within the threshold of the target goal.

10. The computer system of claim 9, wherein the memory further stores instructions to cause the processor to assign a magnitude value to each element in the set of unique elements.

11. The computer system of claim 10, wherein one of the base properties determined is a presence attribute.

12. The computer system of claim 10, wherein one of the base properties determined is a magnitude attribute.

13. The computer system of claim 10, wherein one of the base properties determined is a position attribute.

14. The computer system of claim 10, wherein the memory further stores instructions to cause the processor to normalize outputs of all base properties amongst each other.

15. The computer system of claim 10, wherein the memory further stores instructions to cause the processor to identify the trends using a linear progression function.

16. The computer system of claim 10, wherein the memory further stores instructions to cause the processor to generate a heuristic definition including references to the sub geometric structures.

17. A method for monitoring a motor by cognitive fingerprinting, comprising:
   extracting, by a processor, a data set from a plurality of input sources across a monitored motor;
   compiling a dictionary of unique elements identified in the data set, each unique element representing a unique discrete portion of the data set corresponding to a portion of the monitored engine or a status of the portion of the monitored motor;
   organizing the unique elements of the data set into a two-dimensional geometric structure, portions of the data in the geometric structure further grouped into a plurality of sub geometric structures;
   generating a heuristic describing the two or greater-dimensional geometric structure, the plurality of sub geometric structures, one or more base properties determined for each sub geometric structure, the base properties determined using the dictionary of unique elements, and one or more trends identified in the base properties among the sub geometric structures;

applying one or more pattern recognizers to the heuristic to produce a set of fingerprint elements corresponding to one or more discrete qualities in or attributes of the data set corresponding to the monitored motor;

creating a cognitive fingerprint corresponding to the fingerprint elements;

comparing, by the processor, the cognitive fingerprint to a previously recorded cognitive fingerprint by taking a sum of squared differences between each element in the final set of elements and each element of the previously recorded cognitive fingerprint to determine a scalar value for comparison to a threshold of a target goal; and one or more of shutting down the monitored motor or adjusting an operational parameter of the monitored motor in response to the scalar value being within the threshold of the target goal.

18. The method of claim 17, wherein the motor is one of an electric motor, an internal combustion engine, a diesel engine, a turbine engine, a pump motor, a wind turbine, a water turbine, an electrical generator, or combinations thereof.

19. The method of claim 17, wherein the input sources include one of motor speed, motor heat, motor oil level, motor vibration, motor power consumption, motor fuel consumption, motor power output, or combinations thereof.

20. The method of claim 19, wherein the unique elements include one of recorded motor speeds, recorded motor temperatures, recorded motor oil volumes, recorded motor oil viscosities, recorded motor vibration frequencies, recorded motor vibration amplitudes, recorded mechanical or electrical power levels consumed by the motor, recorded fuel quantities delivered to the motor, recorded mechanical or electrical power levels produced by the motor, or combinations thereof.

21. The method of claim 1, wherein the input sources include one of system logs, system processes, databases, CSV files, database tables, polled information from an application programming interface (API), polled information from Windows Management Instrumentation (WMI), information gathered from web services, information gathered from web sites, or combinations thereof.

* * * * *